Figure 1:
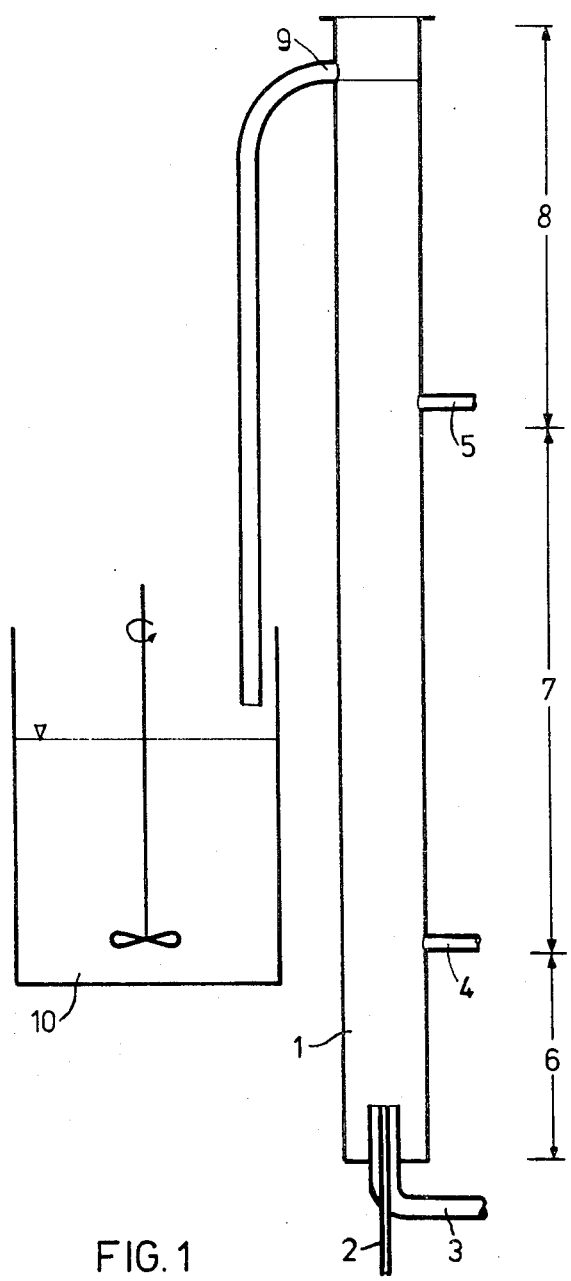

United States Patent [19]

Lange et al.

[11] 4,427,794

[45] Jan. 24, 1984

[54] PROCESS FOR THE PREPARATION OF BEAD POLYMERS OF UNIFORM PARTICLE SIZE BY POLYMERIZATION OF MICROENCAPSULATED MONOMER

[75] Inventors: Peter M. Lange, Leverkusen; Werner Strüver, Cologne, both of Fed. Rep. of Germany

[73] Assignee: Bayer Aktiengesellschaft, Leverkusen, Fed. Rep. of Germany

[21] Appl. No.: 290,982

[22] Filed: Aug. 7, 1981

[30] Foreign Application Priority Data

Aug. 22, 1980 [DE] Fed. Rep. of Germany ....... 3031737

[51] Int. Cl.³ .............................................. C08D 5/20
[52] U.S. Cl. ................................................... 521/28
[58] Field of Search ......................................... 521/38

[56] References Cited

U.S. PATENT DOCUMENTS

| | | | |
|---|---|---|---|
| 3,429,827 | 2/1969 | Rims | 264/4 |
| 3,458,436 | 7/1969 | Martinola et al. | 210/678 |
| 3,577,515 | 5/1971 | Vandegaer | 106/20 |
| 3,862,924 | 1/1975 | Hamann et al. | 521/38 |
| 3,922,255 | 11/1975 | Koestler et al. | 526/65 |

OTHER PUBLICATIONS

P. Naefe et al., Chem. Ing. Tech. (50/1978), Nr. 4, pp. 321–327.

*Primary Examiner*—Joseph L. Schofer
*Assistant Examiner*—Peter F. Kulkosky
*Attorney, Agent, or Firm*—Sprung, Horn, Kramer & Woods

[57] ABSTRACT

Process for the production of bead polymers of improved uniform particle size and uniform quality comprising (a) producing droplets which have a uniform particle size from the monomer or polymerization mixture to be polymerized by spraying the monomer or polymerization mixture into a liquid (continuous phase) which is essentially immiscible with the monomer or polymerization mixture, (b) encapsulating these droplets of uniform size are by shells which are stable under the polymerization conditions to be used and (c) then polymerizing the encapsulated droplets, and with the provision to maintain in the process steps of droplet production and encapsulation of the droplets certain special conditions.

9 Claims, 1 Drawing Figure

PROCESS FOR THE PREPARATION OF BEAD POLYMERS OF UNIFORM PARTICLE SIZE BY POLYMERIZATION OF MICROENCAPSULATED MONOMER

The demands which modern ion exchanger technologies make on the properties of the individual exchanger types are growing all the time. In addition to ever-increasing requirements of capacity, kinetics and stability to mechanical and osmotic loads, an ever-greater uniformity of particle size is increasingly required. Particularly high demands on the uniformity of particle size are made if the hydrodynamic is a decisive parameter of the process employed.

For example, high performance ion exchange filters require a large particle of as uniform a size as possible for large throughputs, because the fine particles settle in the inter-particle volume of the large beads and increase the resistance of the filter in this manner. As a result of the increased resistance, increased pressures must be applied for the required large throughputs, and these pressures in turn easily lead to breakage of the exchanger beads.

A largely uniform particle size is likewise important for exchangers which are employed in mixed-bed filters. A greatly different particle size leads to an extensive intermixing of the fine portions of the specifically heavier ion exchanger with the large particles of the specifically lighter ion exchanger. Also in the case of a layer separation process for mixed-bed filters, a uniform particle size is desired in each case for the three components, anion exchanger, separating layer material and cation exchanger. A resin of uniform particle size is likewise of advantage for the trouble-free functioning of the counter-current process described in U.S. Pat. No. 3,458,436.

Various experiments for the preparation of ion exchangers, or the matrices on which they are based, of as uniform a particle size as possible have therefore already been undertaken. In the case of the known processes for the preparation of ion exchangers or the matrices thereof, the starting materials are either bead polymers or bead condensates which are obtained by suspension polymerisation or suspension condensation of the starting compounds, or cross-linked polymers or polycondensates obtained in bulk are ground. With both techniques, the particles are produced in a particle size distribution which frequently can be represented by a Gauss curve. In order to approach the desired uniformity of particle size, physical separation processes, such as sieving or fractional flotation, are required. Separation processes of this type are firstly troublesome and, secondly, have the serious disadvantage that the over-sized particles and under-sized particles necessarily produced during the course of such processes often can no longer be utilised, or at least can only be utilised with difficulty. The quantity of undesired under-sized particles or over-sized particles increases in these processes with growing demands on the uniformity of particle size.

In the case of bead polymers, the average particle size can be influenced to a certain extent, the width of the particle size spectrum, in contrast, only to a very limited extent, by the polymerisation conditions. For example, suspension polymerisations with the aid of which a certain narrowing of the particle size distribution is achieved are described in U.S. Pat. No. 4,129,707. However, the quantities of under-sized particles and over-sized particles are merely reduced, and particles of uniform particle sizes cannot be obtained with these processes.

The process described in U.S. Pat. No. 3,784,491 for the preparation of polymer particles of uniform size also does not yield bead polymers of uniform particle size. According to this process, the liquid droplets produced from the mixture to be polymerised are protected from agglomeration by enveloping with soluble gelatine-containing complex coazervates. However, since the liquid droplets are already subjected to shearing forces before the enveloping process, these forces causing a fusion and division of the droplets, particles of the most diverse particle size are enveloped according to the process. The enveloping process therefore does not lead to the desired polymer particles of uniform particle size. In addition, the soluble gelatine-containing complex coazervates proposed for enveloping the liquid droplets are liquid and therefore do not protect the droplets from division under the action of shearing forces, even after envelopment. In addition, the liquid shells dissolve under the preferably applied alkaline polymerisation conditions.

A more favourable process for the preparation of bead polymers of uniform particle size is described in U.S. Pat. No. 3,922,255. According to this process, the monomer droplets of equal size which are produced by means of a nozzle tray are transferred to a reaction column in which they reside until the polymerisation is so far advanced that they can be removed from the column without undergoing damage. In this process, the residence time is established by the flow of a continuous phase, the flow being opposed to the output thrust of the droplets. Apart from the great technical effort, the great disadvantage of this process is that the liquid flow which regulates the residence time must have such a high linear velocity that a velocity profile forms over the column cross-section, leading to a non-uniform residence time for the individual monomer droplets in the polymerisation column. The different residence times of the monomer droplets lead to differences in quality of the exchanger beads obtained from the polymers. The difference in quality between the polymer beads, which is caused by the extreme hydrodynamic conditions of the polymerisation column, greatly limits the usefulness of the process.

The processes for the encapsulation of liquids, for example the processes described in U.S. Pat. Nos. 3,429,827 and 3,577,515, also gave no suggestion for the solution of the technical problem—preparation of bead polymers of uniform particle size and quality—since, according to these processes, neither capsules of uniform particle size nor of uniform physical properties are obtained.

Thus, the process for the encapsulation of liquids which is described in U.S. Pat. No. 3,429,827, does not yield capsules of equal size, because, as a result of the encapsulation conditions applied, the formation of uniformly round droplets, if not prevented, is at least greatly hindered by a formation of the capsule wall which sets in too early (see the appropriate data in U.S. Pat. No. 3,577,515, column 2, line 65 to column 3, line 5). The measures proposed in U.S. Pat. No. 3,577,515 for avoiding the disadvantages inherent in the process proposed in U.S. Pat. No. 3,429,827 also do not lead, however, to capsules of uniform size, because the droplets, before a stable capsule wall can be formed, exhibit the most diverse sizes by flowing together and dividing as a result of the shearing forces acting upon them, and are consequently transformed into capsules of different sizes.

It has now been found that bead polymers of uniform particle size and uniform quality are obtained if monomer droplets or droplets of the polymerisation mixture which have a uniform particle size are produced from the monomer or polymerisation mixture to be polymerised by spraying the monomer or polymerisation mixture into a liquid (continuous phase) which is essentially immiscible with the monomer or polymerisation mixture, these droplets of uniform size are encapsulated with shells, which are stable under the polymerisation conditions to be used, according to processes of micro-encapsulation which are in themselves known, the encapsulated droplets are then polymerised, and certain conditions are maintained in the process steps of droplet production and encapsulation of droplets.

The invention therefore relates to a process for the preparation of bead polymers of uniform particle size and uniform quality, which is characterised in that (a) droplets of uniform size are produced from the monomer or polymerisation mixture to be polymerised by spraying these materials into a liquid which is continuously fed in and which is essentially immiscible with the monomer or polymerisation mixture;

(b) these droplets of uniform size are continuously encapsulated in the said liquid according to processes of microencapsulation which are in themselves known either directly with shells which are stable under the polymerisation conditions to be used, or first with shells which are stable to shearing forces, and, in a second step, continuously or discontinuously hardening these shells which are stable to shearing forces to give shells which are stable under the polymerisation conditions to be used;

(c) the monomer droplets or droplets of polymerisation mixture encapsulated with shells which are stable under the polymerisation conditions to be used are then polymerised, with the provision, ($\alpha$) that the monomer or the polymerisation mixture is sprayed into the continuously fed-in continuous phase, co-current with this phase;

($\beta$) that the production of the droplets and the encapsulation thereof are undertaken in different regions of the reaction vessel;

($\gamma$) that the process steps (a) and (b) are carried out in such a manner that no forces which alter the integrity of the droplets act on the droplets from their production until their encapsulation.

The encapsulation with a shell which is stable under the polymerisation conditions to be used is carried out in two steps if the shells produced around the droplets according to the processes of micro-encapsulation are stable to shearing forces, but are not stable under the polymerisation conditions to be used.

In this case, the shells must be hardened in a second process step, which can be continuously or discontinuously carried out, to give shells which are stable under the polymerisation conditions. The hardening step can be carried out in a separate working step in a separate vessel; however preferably the hardening step is carried out in the same vessel.

On the other hand, if the shells produced around the droplets according to the process of micro-encapsulation are already stable under the polymerisation conditions to be used, the hardening step is omitted, and the encapsulation with the shells which are stable under the polymerisation conditions to be used is carried out in one step.

Within the scope of the process according to the invention, shells are designated as being stable to shearing forces if they withstand, without being damaged, stirring motions of an intensity such as are applied under the conditions of customary suspension polymerisations in order to produce droplets of equal size.

By means of the combination, according to the invention, of the production of monomer droplets or droplets of polymerisation mixture of uniform size, the stabilisation of these droplets by encapsulation, and the polymerisation of the droplets encapsulated with a shell which is stable under the polymerisation conditions, and carrying out these steps whilst maintaining certain conditions, bead polymers are obtained, the beads of which are distinguished by approximately equal particle size and by uniformity in their physical properties, such as particle stability, breaking strength, etc.

The process according to the invention is suitable for the preparation of bead polymers of uniform particle size from the most diverse monomers. A prerequisite for the applicability of the process is merely that the polymerisation mixture should be liquid under the conditions of spraying. Within the scope of the present invention, the designation polymerisation mixture is to be understood as meaning monomers or monomer mixtures which are to be polymerised and to which customary polymerisation additives have been added.

Polymerisation initiators (radical-forming agents such as azoisobutyronitrile and dibenzoyl peroxide) and polymerisation inhibitors, as well as inert liquids and polymers, which cause a structural change of the polymer, for example macroporosity, during the polymerisation, may be especially mentioned as customary polymerisation additives.

The polymerisation mixture can furthermore contain dyestuffs and, if the bead polymers should contain extraction agents incorporated in the polymer for the liquid/liquid extraction, it can also contain extraction agents for the liquid/liquid extraction.

The polymerisation mixtures can also contain compounds which react with other compounds in forming the capsule wall.

The process according to the invention is suitable for the preparation of gel-type as well as macroporous bead polymers.

The following may be mentioned as examples of monomers which can be used in the process according to the invention: mono-unsaturated compounds, such as monovinyl compounds, for example styrene, vinyltoluene, ethylstyrene and $\alpha$-methylstyrene, and derivatives thereof which are halogenated in the nucleus, such as chlorostyrene; and, furthermore, vinyl benzyl chloride and acrylic acid, and salts and esters thereof, particularly the methyl and ethyl esters, and methacrylic acid and salts and esters thereof, particularly the methyl ester, and, furthermore, the nitriles and amides of acrylic acid and methacrylic acid.

The following may be particularly mentioned as poly-unsaturated compounds: polyvinyl compounds, such as divinylbenzene, divinyltoluene, trivinylbenzene, divinylnaphthalene, trivinylnaphthalene, diethylene glycol divinyl ether, trivinylcyclohexane, 1,7-octadiene, 1,6-heptadiene, 1,5-hexadiene, methacrylic acid esters of polyhydric alcohols, for example ethylene glycol dimethacrylate, and methylene-N,N'-bisacrylamide.

The following have proved particularly useful as monomers in the process according to the invention: styrene, α-methylstyrene, ethylstyrene, chlorostyrene, esters and/or amides of (meth)acrylic acid, and acrylonitrile as monovinyl compounds, and divinylbenzene, divinyltoluene, trivinylbenzene, diethylene glycol divinyl ether, trivinylcyclohexane, 1,7-octadiene, 1,6-heptadiene, 1,5-hexadiene and/or methacrylic acid esters of polyhydric alcohols as divinyl compounds.

The production of droplets of equal size by means of spraying is known (see for example Naefe et al. in Chem. Ing. Techn. 50, 4 (1978) page 321; also U.S. Pat. No. 3,922,255). The outflow velocities required for disintegration into droplets of equal size can be calculated with the aid of the formula given in Naefe et al. loc. cit.

The spraying of a monomer or polymerisation mixture into the liquid (continuous phase) which is essentially immiscible with the monomer or polymerisation mixture and which is continuously fed in, for the production of the monomer droplets of uniform particle size is effected in the simplest case by means of a capillary through which the liquid monomer or polymerisation mixture flows into the continuous phase. When the monomer stream emerges into the continuous phase, a disintegration of the monomer jet into droplets of equal size occurs. In industrial plant, a single capillary can be replaced by perforated discs with capillary borings, or similar devices. The particle size is determined by the internal diameter of the capillary or capillary bores.

In the process according to the invention, the region of the reaction vessel in which the monomer jet enters the continuous phase and the monomer droplets formed in the continuous phase during the disintegration of the jet assume their final spherical form is designated as the spraying region.

This region is followed by the encapsulation region, that is to say, the region of the reaction vessel in which the fully formed monomer droplets are provided with a shell which is stable under the polymerisation conditions to be used or which is stable to shearing forces.

It is essential for the invention that the spraying region and encapsulation region are two different regions, that is to say successively passed through by the monomer droplets, and that spraying and encapsulation do not take place in the same region of the reaction vessel, as in the case of the known processes, for example the process described in U.S. Pat. No. 3,429,827. By this separation of the spraying region and encapsulation region according to the invention, it is prevented that parts of the monomer jet are already encapsulated before their complete disintegration into droplets, and, in this manner, particles of different form and size are enveloped and later polymerised. The spraying region and encapsulation region can be demarcated from one another by mechanical devices which do not hinder the free movement of the monomer droplets in the flowing continuous phase, for example constrictions of the reaction tube or funnel-shaped installations in the reaction vessel. However, they can also pass directly into one another.

Furthermore, it is essential for the invention that from the production to the completed encapsulation of the monomer droplets no forces which cause a change in the integrity of the individual droplets act on the droplets. Shearing forces which act on monomer droplets when systems composed of monomer droplets distributed in a continuous phase are stirred may be especially mentioned as those forces to be avoided according to the invention.

The action of shearing forces on the monomer droplets of equal size produced during the disintegration of the jet is avoided according to the invention in that these droplets are hydrodynamically transported out of the spraying region and, subsequently, through the encapsulation region.

According to the invention, the movement caused by the difference in density between the monomer droplets and the continuous phase, that is to say, the upward thrust or the sinking of the droplets in the continuous phase and the flowing movement of the continuous phase, is utilised for the hydrodynamical transport of the droplets through the reaction vessel, that is to say out of the spraying region and through the encapsulation region. The utilisation of these effects is made possible by the fact that the droplets and the continuous phase are conducted co-currently through the reaction vessel.

Water or dilute aqueous solutions of the materials which are conducive for the encapsulation, for example dilute solutions of bases, such as sodium carbonate, and/or solutions of suitable suspension stabilisers such as, preferably, gelatine, have proved suitable as the continuous liquid, which is essentially immiscible with the monomer or polymerisation mixture and which is continuously fed in, for lipophilic monomers, such as styrenes, (meth)acrylic acid esters, (meth)acrylonitrile and divinylbenzene, or lipophilic polymerisation mixtures, and hydrophobic media, for example aliphatic and aromatic (halogenated) hydrocarbons or silicone oils, are suitable for polar water-soluble monomers, such as (meth)acrylic acid or polymerisation mixtures.

The ratio of the volumes $V_{cont}:V_{mono}$ ($V_{cont}$=volume of the continuous phase; $V_{mono}$=volume of the monomer or polymerisation mixture) should be lower than the value of 0.1. The volume ratio is 0.1 to 60, according to the encapsulation process employed. In the case of encapsulation according to the coazervation process, it is preferably about 3 to 60, and in the case of encapsulation according to the complex coazervation process and the phase interface reaction process it is about 1 to 20.

The upper limits of the volume ratios are determined in this process by the cost efficiency of the process, since the space/time yield of encapsulated monomer droplets decreases with increasing ratio. Since the encapsulation of monomer droplets of equal size does not differ as such from the known continuous and discontinuous encapsulation processes, in principle the volume ratios and also the concentration of the various components described or cited for the known encapsulation processes, for example in the reviews of Kondo Surf. Colloid Sci., 10, 1978, pages 1 to 43 and Kirk-Othmer, Encyclopedia of Chemical Technology, Second Edition, Volume 13, pages 436 to 456, can be used.

The monomer of polymerisation mixture is normally sprayed in at temperatures of from 0° to 95° C., preferably at 5° to 70° C.

During the spraying-in of the monomer or polymerisation mixture into the continuous phase, the continuous phase flows co-currently with the jet of polymerisation mixture. The use of concentric dual nozzles has proved very particularly suitable for the introduction of a spray. In this process, the polymerisation mixture flows through the inner, and the continuous phase through the outer, of the two concentrically arranged nozzles.

In order to exclude disturbances during the disintegration of the jet, which disturbances have an adverse effect on the uniformity of the droplet size, it can be advantageous to cause the jet of polymerisation mixture to move in longitudinal oscillations of a suitable frequency. This can occur, for example, by the action of periodical pressure variations, such as soundwaves or periodical movement of the nozzle.

The continuous phase advantageously contains dissolved substances (droplet stabilisers) which prevent the droplets of polymerisation mixture from flowing into each other before the encapsulation step. The suspension auxiliary agents known from bead polymerisation technology, for example polyvinyl alcohol or methylcellulose, are examples of suitable droplet stabilisers. The use of droplet stabilisers which can simultaneously serve to build up the capsule wall has proved particularly advantageous. Gelatine and agar-agar may be mentioned as examples of such stabilisers.

The concentration of the stabilisers in the continuous phase is customarily 0.01 to 10% by weight, relative to the weight of the continuous phase.

The production of the droplets of polymerisation mixture of uniform size is followed by the encapsulation process. For encapsulation, the droplets are moved out of the region in which they were produced (spraying region) and into the bordering encapsulation region. The temperature of the encapsulation region can be established independently of the temperature of the spraying region. In addition, the encapsulation region is equipped with devices which allow further liquid components to be fed in.

The encapsulation of the stabilised droplets of polymerisation mixture of uniform particle size is carried out continuously, according to processes of microencapsulation which are in themselves known. Such known processes are, for example:

(a) Coacervation

In the coacervation process a colloid-rich phase is formed, which surrounds the droplet of polymerisation mixture. Hydrophilic colloids, such as gelatine or agar-agar, are suitable for the encapsulation by means of coacervation. In order to initiate the coacervation process, an aqueous salt solution, for example, is fed to the encapsulation region. Alkali metal sulphates, particularly sodium sulphate, have proved suitable as salts when gelatine is used as the hydrophilic colloid. The encapsulation by means of coacervation can be particularly simply carried out by choosing an aqueous solution of a hydrophilic colloid, such as gelatine or agar-agar, as the continuous phase in which the disintegration of the jet of polymerisation mixture is effected. The disintegration of the jet is undertaken at temperatures above the gelatinising temperature of the colloid.

The formation of the coacervate shell is followed by the setting thereof by cooling the material below the gelation temperature. Although the coacervate shell thus produced is stable to shearing forces, it is, however, frequently not stable under the polymerisation conditions to be used. In order to arrive at shells which are stable under the polymerisation conditions to be used, the encapsulated particles are subjected to a chemical hardening. Processes for chemical hardening, for example the hardening of gelatine with aldehydes such as formaldehyde, are known (see, for example, U.S. Pat. No. 2,800,458). The chemical hardening of the particles can be undertaken continuously or discontinuously in the same reaction vessel or in another reaction vessel.

(b) Complex coacervation

In the complex coacervation process, a colloid-rich phase compose of two differently charged colloids (polyelectrolytes) is formed, and this phase surrounds the monomer droplet. Systems composed of gelatine and gum arabic, or of gelatine and special copolymer mixtures composed of a copolymer with statistically distributed residues of acrylamide and maleic acid or maleic acid anhydride and a copolymer with statistically distributed residues of acrylamide, acrylic acid and maleic acid, are examples of suitable materials for encapsulation by complex coacervation. Such copolymer mixtures are described, for example in U.S. Pat. No. 4,181,639, as complex coacervation components. In order to initiate the complex coacervation process, the pH value of the encapsulation region, for example, is adjusted by the addition of acids, in the case of the system gelatine/gum arabic, for example, so that only one of the polyelectrolytes originally charged in the same sense changes the sign of its charge. Subsequent to the formation of the complex coacervate shell around the droplet of polymerisation mixture, the droplet moves in a section of the encapsulation region which is adjusted to a temperature below the gelation temperature.

Although the complex coacervate shell thus produced is stable to shearing forces, it is, however, frequently not stable under the polymerisation conditions to be used. In order to arrive at shells which are stable under the polymerisation conditions to be used, the encapsulated particles are mostly also subjected to a chemical hardening. Such processes for chemical hardening, for example for the hardening of capsule walls containing gelatine using aldehydes such as formaldehyde, are known (see U.S. Pat. No. 2,800,457).

(c) The phase interface reaction

In the encapsulation process by means of a phase interface reaction, the capsule wall which envelops the droplet of polymerisation mixture is formed by the reaction of a component 1 contained in the polymerisation mixture with a component 2 added to the continuous phase in the encapsulation region, the reaction taking place at the phase interface droplet/continuous phase, with formation of a film. In practice, this encapsulation by means of a phase interface reaction is carried out in such a manner that a component 1 is added to the polymerisation mixture, the former being miscible with the latter, but largely immiscible with the continuous phase. After the polymerisation mixture has been divided into droplets of equal size, the droplets being stabilised by any desired suspension auxiliary agent, the swarm of droplets moves into the encapsulation part. In this part, a component 2 is fed in. This component 2 is soluble in the continuous phase. Component pairs $K_1/K_2$, which react at the phase interface with the formation of a film, are known in great number. The halides of polybasic acids, such as sebacoyl chloride, terephthaloyl chloride and phosgene, polyvalent isocyanates, such as toluene-2,4-diisocyanate and hexamethylenediisocyanate, and chlorides of polybasic sulphonic acids, such as benzene-1,3-disulphonyl chloride, on the one hand, and polyvalent amines, such as hexamethylenediamine, and polyhydric hydroxyl compounds, such as pyrogallol and bisphenol A, on the other hand, may be quoted as examples of these components, which react to give polymeric carboxylic acid amides and carboxylic acid esters, polyureas and polyurethanes, and polymeric sulphonamides and sulphonic acid esters (see, for example, P. G. Morgan, "Interfacial Polycondensation, A. Versatile Method of Polymer Preparation", Soc. Plastics Engineers Journal, 15, 485–495)). The different reactivity of the various component pairs $K_1/K_2$ is taken into account by adjusting the residence time in the encapsulation region and by establishing particular temperatures.

It has proved advantageous in some cases concomitantly to use substances which promote the phase interface reaction, for example bases in the case of polycondensation reactions in which acids are formed. These auxiliary materials are preferably added to the continuous phase of the encapsulation region.

The complex coacervation process is preferably used.

The process steps essential to the invention—production of droplets of polymerisation mixture of equal size by spraying the polymerisation mixture co-currently into the continuous phase which is continuously fed in, and encapsulation of the droplets of equal size—can be carried out in a particularly simple manner in the reaction column described in FIG. 1. The arrangement described in FIG. 1 is preferably used if the polymerisation mixture to be encapsulated has a lower density than, or an equal density to, the continuous phase. In FIG. 1, section 6 designates the spraying region of reaction column 1, that is to say, the region in which the disintegration of the jet of polymerisation mixture which is sprayed in through nozzle 2 is effected, and the droplets formed during the disintegration of the jet assume their final spherical form. The solution (continuous phase) which stabilises the droplets of equal size flows from feed pipe 3. The component which initiates the encapsulation process is continuously metered in through feed pipe 4 in the lower part of section 7. Setting components can be fed in through feed pipe 5. A hardening process can take place in section 8. The temperatures of the individual sections 6, 7 and 8 of reaction column 1 can be controlled independently of one another, and these sections are provided with monitoring instruments, such as thermometers and pH measuring devices. It can be seen from FIG. 1 that the encapsulated droplets of polymerisation mixture can form without the adverse effect of shearing forces. At overflow 9 of reaction column 1, encapsulated droplets of polymerisation mixture are present, the integrity of which is no longer impaired even during the subsequent action of mechanical forces, for example during stirring in the polymerisation vessel 10.

The reaction column 1 arranged in principle in the same manner as described in FIG. 1 is suitable for the encapsulation of polymerisation mixtures which have a higher density than the continuous phase, but, in this case, in column section 6 and the inlet for the polymerisation mixture 2 and the continuous phase 3 are situated at the upper end of the tube, and section 8 and outlet 9 at the lower end of the reaction column.

THE POLYMERISATION OF THE ENCAPSULATED POLYMERISATION MIXTURE

After the encapsulation, the droplets of polymerisation mixture are in a condition which allows them to be manipulated, for example to be stirred whilst warming, without the integrity of the encapsulated droplets being impaired.

In this respect, the present process shows an essential difference to the conventional suspension polymerisations in which the droplets are unstable as discrete individuals owing to division and coalescence, until a certain degree of polymerisation is reached. In contrast, the encapsulated monomer droplets retain their integrity and thereby also their uniform size.

The polymerisation of the polymerisation mixture in the encapsulated droplets is effected by warming the capsules, which have been hardened if necessary, for several hours in an aqueous suspension to temperatures of from 40° to 95° C. The polymerisation of the encapsulated droplets of polymerisation mixture can be carried out in the same containers as are used for the customary suspension polymerisation process.

REMOVAL OF THE CAPSULE WALL

A firm bead polymer of stable shape is present after the polymerisation operation. The capsule wall can be removed from this bead in a separate process step. However, the capsule wall can also be removed—if the bead polymer is to be further processed to give an ion exchanger—during the introduction of the functional groups.

(a) Removal of the capsule wall in a separate process step

To remove the capsule wall, the encapsulated bead polymer is subjected to a chemical treatment by means of which the capsule wall is destroyed. The type of chemical treatment depends on the chemical structure of the capsule wall. For example, capsule walls composed of gelatine or hardened gelatine are removed by warming the encapsulated bead polymers for several hours with dilute aqueous acids, such as dilute sulphuric acid, or aqueous bases, for example dilute sodium hydroxide solution. A hydrolytic degradation of the same type, or a similar hydrolytic degradation, is also used in the destruction of capsule walls composed of polyamides, such as hexamethylenediamine and adipic acid, polyesters, such as terephthaloyl chloride and bisphenol A, and polyureas, such as toluene-2,4-diisocyanate and hexamethylenediamine.

(b) Removal of the capsule wall during introduction of functional groups

The introduction of functional groups into polymers is effected in most cases under drastic conditions. Thus, to introduce sulphonic acid groups into cross-linked polystyrene, the bead polymer is treated with hot concentrated sulphuric acid. In the alkaline hydrolysis of cross-linked polyacrylic acid esters, the bead polymers are heated for several hours with 40% strength sodium hydroxide solution. Under these conditions, the capsule wall is also simultaneously destroyed, and the removal of the capsule wall can be carried out in one operational step with the introduction of the functional groups. The introduction of the functional groups is in no way adversely affected by the capsule wall.

INTRODUCTION OF FUNCTIONAL GROUPS

The introduction of functional groups into the polymer beads which are prepared according to the invention and which have a uniform particle size is effected according to known processes. A review of these processes can be found, for example, in Ullmanns Enzyklopädie der Technischen Chemie (Ullmanns Encyclopaedia of Industrial Chemistry), 4th edition, Volume 13, pages 300 to 303.

The bead polymers of uniform particle size prepared by the process according to the invention can be used in their existing state, for example as so-called adsorption resins or inert separating layer materials for separating layers in mixed-fed filters, or they serve, as already shown above, as matrices for the preparation of ion exchangers.

The parts used in the examples which follow are parts by weight, if not otherwise indicated.

EXAMPLE 1

A 45° C. solution of 86 parts of styrene, 8 parts of divinylbenzene, 5 parts of ethylstyrene and 1 part of dibenzoyl peroxide are sprayed, with a velocity of 2.7 ml/min, through the capillary 2 (internal diameter: 0.35 mm; capillary material: stainless steel) into the apparatus described in FIG. 1. An aqueous 10% strength gelatine solution (pigskin gelatine) warmed to 55° C. serves as the continuous phase. This continuous phase has a pH value of 7.8 and is fed through 3 with a velocity of 12 ml/min. The spraying region 6 is kept at a temperature of 50° C. An aqueous 20% strength sodium sulphate solution is metered through the feed tube 4 with a velocity of 4.7 ml/min.

In the encapsulation region 7, the temperature of the continuous phase is regulated so that it falls from 50° C. (at the lower end) to 15° C. (at the upper end). An aqueous 5% strength sodium sulphate solution at a temperature of 15° C. is fed through 5 with a velocity of 100 ml/min.

The capsule suspension flowing out at 9 is transferred to a stirred mixing vessel 10 and is stirred in this vessel for 2 hours and then washed with water at a temperature of 15° C. 10 ml of formalin (36% strength) and 10 g of disodium hydrogen phosphate dodecahydrate per liter of aqueous phase are then added to the suspension, whilst stirring. The suspension is warmed to 25° C. in the course of 2 hours.

The capsules are then freed from excess formalin by washing with water. The polymerisation mixture in the capsules is then polymerised by warming the hardened capsules suspended in water to 70° C. for 10 hours, whilst stirring. The encapsulated bead polymer obtained in this manner and composed of gel-type polystyrene crosslinked with divinylbenzene is converted, after separating off, washing and drying the capsules and without previous removal of the capsule wall, into a strongly acid cation exchanger by means of sulphonation in a known manner (see Ullmann loc cit page 303).

The particle size of the strongly acid cation exchanger thus obtained (Na+ form) is in the range of 0.8–1.2 mm; 80% of the beads have a particle size in the range of 0.9–1.1 mm.

In contrast, the customary bead polymerisation of the same polymerisation mixture in a 0.2% strength aqueous methylcellulose liquor with subsequent sulphonation yields a cation exchanger in which only 53% of the beads have a particle size of 0.8–1.2 mm and only 29% of the beads have a particle size of 0.9–1.1 mm.

EXAMPLE 2

A 40° C. solution of 91 parts of styrene, 5 parts of divinylbenzene, 3 parts of ethylstyrene, one part of azoisobutyronitrile and 60 parts of isododecane are sprayed with a velocity of 4.8 ml/min through the capillary 2 (internal diameter: 0.4 mm; capillary material: stainless steel) into the apparatus described in FIG. 1.

An aqueous solution, warmed to 45° C. and containing 1% by weight of gelatine (pigskin gelatine) and 1% by weight of gum arabic, serves as the continuous phase. The continuous phase has a pH value of 5.7 and is fed in through 3 with a velocity of 15.3 ml/min. The spraying region 6 is kept at a temperature of 45° C. 0.1 normal hydrochloric acid is fed in through the feed tube 4 in the amount necessary to lower the pH value of the continuous phase to 4.0 (+/−0.1).

In the encapsulation region 7, the temperature of the continuous phase is regulated so that it falls from 45° C. (at the lower end) to 15° C. (at the upper end). A stream of ice water is fed in through 5 with a velocity of 20 ml/min.

The capsule suspension emerging at 9 is transferred to a stirred mixing vessel 10, where it is stirred for 3 hours at 0° C. 30 ml of formalin solution (36% strength) per liter of aqueous phase, 5% strength sodium hydroxide solution sufficient for reaction under alkaline conditions and 20 g of disodium hydrogen phosphate dodecahydrate per liter of aqueous phase are then added to the suspension. The capsule suspension is the stirred for 4 hours at 25° C.

The hardened capsules are then washed with water and are stirred in aqueous suspension for 10 hours at 70° C. to polymerise the mixture. After the encapsulated bead polymer has been separated off from the aqueous phase, the former is washed and dried.

The encapsulated bead polymer which is obtained in this manner and is composed of macroporous polystyrene crosslinked with divinylbenzene, is then converted, without previous removal of the capsule wall, into a strongly basic anion exchanger, according to the process described in U.S. Pat. No. 3,989,650 by means of amidomethylation with phthalimidomethyl acetate, alkaline hydrolysis, and quaternisation with chloromethane.

The particle size of the strongly basic anion exchanger thus obtained (Cl− form) is in the range of 0.8–1.3 mm; 91% of the beads have a particle size in the range of 0.9–1.2 mm.

In contrast, the customary polymerisation of the same polymerisation mixture in a 0.2% strength aqueous methylcellulose liquor with subsequent amidomethylation and quaternisation yields an anion exchanger in which only 54% of the beads have a particle size of 0.8–1.3 mm and only 31% of the beads have a particle size of 0.9–1.2 mm.

EXAMPLE 3

A solution cooled to 5° C., which had been freshly prepared from one part of azoisobutyronitrile, 1.5 parts of sebacoyl chloride and a mixture composed of 86 parts of styrene, 8 parts of divinylbenzene and 5 parts of ethylstyrene, and dehydrated with calcium chloride, is sprayed, with a velocity of 2.4 ml/min, through the capillary 2 (internal diameter: 0.35 mm; capillary material: stainless steel) into the apparatus described in FIG. 1. A 0.5% strength aqueous polyvinyl alcohol solution, cooled to 5° C., serves as the continuous phase. This continuous phase is fed in through 3 with a velocity of 7.4 ml/min. The spraying region 6 is kept at a temperature of 5° C. An aqueous solution, containing 12% by weight of sodium carbonate and 8% by weight of hexamethylenediamine, is metered into the column through the feed tube 4 with a velocity of 2.2 ml/min. The encapsulation region 7 is kept at a temperature of 25° C. during this process.

The capsule suspension flowing out at 9 is transferred into a stirred mixing vessel, and is washed in this vessel with water at room temperature.

The polymerisation mixture in the capsules is then polymerised by stirring the aqueous capsule suspension for 10 hours at 70° C.

The encapsulated bead polymer, which is obtained in this manner and which is composed of gel-type polystyrene crosslinked with divinylbenzene, is then treated with 50% strength sulphuric acid at 120° C. to remove the capsule wall. After the bead polymer has been separated off from the aqueous phase, the former is washed and dried.

The particle size of the gelatinous polystyrene bead polymer thus obtained is in the range of 0.5–0.9 mm; 82% of the beads have a particle size in the range of 0.63–0.8 mm.

In contrast, the customary bead polymerisation of the same polymerisation mixture in a 0.2% strength aqueous methylcellulose liquor yields a bead polymer in which only 74% of the beads have a particle size of 0.5–0.9 and only 27% of the beads have a particle size of 0.63–0.8 mm.

EXAMPLE 4

A solution of 86 parts of styrene, 8 parts of divinylbenzene, 5 parts of ethylstyrene, 1 part of azoisobutyronitrile and 3 parts of hexamethylene diisocyanate is sprayed at room temperature, with a velocity of 2.3 ml/min, through the capillary 2 (internal diameter: 0.35 mm; capillary material: stainless steel) into the apparatus described in FIG. 1. A 0.5% strength aqueous polyvinyl alcohol solution at a temperature of 22° C. serves as the continuous phase. This continuous phase is fed in through 3 with a velocity of 8.6 ml/min. An aqueous solution, which contains 12% by weight of sodium carbonate and 8% by weight of hexamethylenediamine, is fed in through the feed tube 4 with a velocity of 2.2 ml/min. The spraying region 6 as well as the encapsulation region 7 are kept at room temperature. The capsule dispersion emerging at 9 is transferred into a stirred mixing vessel 10, where it is washed with water at room temperature. The aqueous suspension is then stirred for 10 hours at 70° C. to polymerise the polymerisation mixture in the capsules.

The encapsulated gel-type bead polymer, which is obtained in this manner and which is composed of polystyrene crosslinked with divinylbenzene, is then converted without previous removal of the capsule wall, into a strongly acid cation exchanger by means of sulphonation in a known manner.

The particle size of the acid cation exchanger thus obtained (Na+ form) is in the range of 0.8–1.3 mm; 81% of the beads have a particle size in the range of 0.9–1.1 mm.

In contrast, the customary bead polymerisation of the same polymerisation mixture in 0.2% strength aqueous methylcellulose liquor with subsequent sulphonation yields a strongly acid cation exchanger in which only 53% of the beads have a particle size of 0.8–1.2 mm and only 29% of the beads have a particle size of 0.9–1.1 mm.

EXAMPLE 5

A 40° C. solution of 86 parts of styrene, 8 parts of divinylbenzene, 5 parts of ethylstyrene and one part of dibenzoyl peroxide is sprayed with a velocity of 2.4 ml/min through the capillary 2 (internal diameter: 0.35 mm; capillary material: stainless steel) into the apparatus described in FIG. 1. An aqueous solution which contains 1% by weight of gelatine (pigskin gelatine), 1% by weight of the mixture which is described in Example 6 of U.S. Pat. No. 4,181,639 and which is composed of an acrylamide/maleic acid anhydride copolymer and the hydrolysis product thereof, and 0.05% by weight of purified sodium carboxymethylcellulose (viscosity according to Brooksfield 650–850 cP in 2% strength solution at 20° C. and 20 rpm), serves as the continuous phase. This continuous phase has a temperature of 45° C. and a pH value of 5.3, and is metered through 3 with a velocity of 5.1 ml/min. The spraying region 6 is kept at a temperature of 45° C. 0.1 normal hydrochloric acid is fed in through the feed tube 4 in the amount required to reduce the pH value of the continuous phase to 3.9 (+/−0.1).

In the encapsulation region 7, the temperature of the continuous phase is regulated so that it falls from 45° C. (at the lower end) to 15° C. (at the upper end). Region 8 is cooled with ice water, so that the capsule suspension flowing out at 9 passes at a temperature of 5° C. into the stirred mixing vessel 10. In addition 12% strength formalin solution is continuously fed to the reaction column through the feed tube 5 with a velocity of 7.5 ml per liter of capsule suspension flowing out at 9, together with such a quantity of 15% strength sodium hydroxide solution, that the pH-value in region 8 is adjusted to 11.5.

When the stirred mixing vessel 10 is full, the feed is interrupted and the capsule suspension flowing out is led to another stirred mixing vessel.

In the filled stirred mixing vessel 10, the aqueous phase is drawn off and is replaced by a solution of 10 g of disodium hydrogen phosphate dodecahydrate per liter of water.

The polymerisation of the polymerisation mixture enclosed in the capsules is then effected by stirring the aqueous suspension for 10 hours at 70° C.

The encapsulated gel-type bead polymer, which is obtained in this manner and which is composed of polystyrene crosslinked with divinylbenzene, is then separated off from the aqueous phase, washed, dried and then converted, without previous removal of the capsule wall, into a strongly acid cation exchanger, by sulphonation in a known manner.

The particle size of the cation exchanger thus obtained (Na+ form) is in the range of 0.8–1.2 mm; 72% of the beads have a particle size in the range of 0.9–1.1 mm.

In contrast, the customary bead polymerisation of the same polymerisation mixture in 0.2% strength aqueous methylcellulose liquor with subsequent sulphonation yields a cation exchanger in which only 50% of the beads have a particle size of 0.8–1.2 mm and only 28% of the beads have a particle size of 0.9–1.1 mm.

What is claimed is:

1. A process for the preparation of bead polymers of improved uniform particle size and uniform quality, comprising
   (a) in known manner producing droplets of uniform size from the monomer or polymerisation mixture to be polymerised by spraying these materials into a liquid which is continuously fed in and which is essentially immiscible with the monomer or polymerisation mixture;
   (b) by means of coacervation, complex coacervation or by a phase interface reaction continuously encapsulating these droplets of uniform size in the said liquid according to processes of micro-encapsulation which are in themselves known either directly with shells which are stable under the polymerisation conditions to be used, or first with shells which are stable to shearing forces, and, in a second step, continuously or discontinuously hardening these shells which are stable to shearing forces to give shells which are stable under the polymerisation conditions to be used;

(c) polymerising the monomer droplets or droplets of polymerisation mixture encapsulated with shells which are stable under the polymerisation conditions to be used, with the provisions ($\alpha$) that the monomer or the polymerisation mixture is sprayed into the continuously fed-in continuous phase, co-current with this phase;

($\beta$) that the production of the droplets and the encapsulation thereof are undertaken in different regions of a single reaction vessel;

($\gamma$) that the process steps (a) and (b) are carried out in such a manner that no forces which alter the integrity of the droplets act on the droplets from their production until their encapsulation.

2. The process of claim 1, wherein the action of the forces which alter the integrity of the droplets is avoided by hydrodynamically transporting the droplets out of the spraying region and through the encapsulation region.

3. The process of claim 1, wherein the movement of the droplets in the continuous phase, which movement is caused by the density difference between droplets and continuous phase, and the flowing movement of the continuous phase are utilised for the hydrodynamic transport of the droplets out of the spraying region and through the encapsulation region.

4. The process of claim 1, wherein water or aqueous solutions are used as the continuous phase when using lipophilic monomers or polymerisation mixtures.

5. The process of claim 1, wherein an aqueous solution of a hydrophilic colloid is used as the continuous phase.

6. The process of claim 1, wherein an aqueous gelatine solution or an agar solution is used as the continuous phase in the encapsulation of droplets of uniform size by means of coacervation or complex coacervation.

7. The process of claim 6, wherein gelatine and gum arabic, or gelatine and copolymer mixtures composed of a copolymer with statistically distributed residues of acrylamide and maleic acid or maleic acid anhydride and a copolymer with statistically distributed residues of acrylamide, acrylic acid and maleic acid, are used as the complex coacervation components.

8. The process of claim 1, wherein a monovinyl compound, a monovinyl compound and a polyvinyl compound or a polyvinyl compound are used as monomer.

9. The process of claim 1, wherein a styrene, $\alpha$-methylstyrene, ethylstyrene, chlorostyrene, esters or amides of (meth)acrylic acid or acrylonitrile, divinylbenzene, divinyltoluene, trivinylbenzene, diethylene glycol divinyl ether, trivinylcyclohexane, 1,7-octadiene, 1.6-heptadiene, 1,5-hexadiene and/or methacrylic acid esters of polyhydric alcohols are used as monomers.

* * * * *